United States Patent
Clark

(10) Patent No.: US 11,301,212 B1
(45) Date of Patent: Apr. 12, 2022

(54) MULTIMODAL DIGITAL MULTIPLICATION CIRCUITS AND METHODS

(71) Applicant: Groq, Inc., Mountain View, CA (US)

(72) Inventor: Christopher Aaron Clark, Madison, WI (US)

(73) Assignee: Groq, Inc., Mountain View, CA (US)

( * ) Notice: Subject to any disclaimer, the term of this patent is extended or adjusted under 35 U.S.C. 154(b) by 0 days.

(21) Appl. No.: 17/060,621

(22) Filed: Oct. 1, 2020

Related U.S. Application Data

(63) Continuation of application No. 16/137,195, filed on Sep. 20, 2018, now Pat. No. 10,831,445.

(51) Int. Cl.
*G06F 7/523* (2006.01)

(52) U.S. Cl.
CPC ...... *G06F 7/523* (2013.01); *G06F 2207/3812* (2013.01)

(58) Field of Classification Search
CPC ............ G06F 7/523; G06F 7/53–5324; G06F 2207/3808–382; G06F 2207/3876
See application file for complete search history.

(56) References Cited

U.S. PATENT DOCUMENTS

| | | |
|---|---|---|
| 3,795,880 A | 3/1974 | Singh |
| 4,791,601 A | 12/1988 | Tanaka |
| 5,038,315 A | 8/1991 | Rao |
| 5,121,352 A | 6/1992 | Hesson |
| 6,111,435 A | 8/2000 | Lan et al. |
| 6,366,944 B1 | 4/2002 | Hossain et al. |
| 2004/0010536 A1 | 1/2004 | Moreno et al. |
| 2004/0024804 A1 | 2/2004 | Zeng |

OTHER PUBLICATIONS

Hatamian et al.: A 70-MHz 8-bit×8-bit Parallel Pipelined Multiplier in 2.5-um CMOS; IEEE Journal of Solid-Slate Circuits, vol. SC-21, No. 4, Aug. 1986; 9 pages.

Pfander, O.A. et al., "A Multiplexer-Based Concept for Reconfigurable Multiplier Arrays," International Conference on Field Programmable Logic and its Applications, 2004, pp. 938-942.

United States Office Action, U.S. Appl. No. 16/137,195, filed Jun. 5, 2020, 20 pages.

United States Office Action, U.S. Appl. No. 16/137,195, filed Oct. 31, 2019, 22 pages.

*Primary Examiner* — Matthew D Sandifer

(74) *Attorney, Agent, or Firm* — Fenwick & West LLP

(57) ABSTRACT

Embodiments of the present disclosure pertain to multimodal digital multiplier circuits and methods. In one embodiment, partial product outputs of digital multiplication circuits are selectively inverted based on a mode control signal. The mode control signal may be set based on a format of the operands input to the multiplier. Example embodiments of the disclosure may multiply combinations of signed and unsigned input operands using different modes.

18 Claims, 9 Drawing Sheets

*Fig. 3A*

| y0 | x0 | x0y0 |      |      |      |      |      |      |      |
|----|----|------|------|------|------|------|------|------|------|
| y1 | x1 | x0y1 | x1y0 |      |      |      |      |      |      |
| y2 | x2 | x0y2 | x1y1 | x2y0 |      |      |      |      |      |
| y3 | x3 | x0y3 | x1y2 | x2y1 | x3y0 |      |      |      |      |
| y4 | x4 | x0y4 | x1y3 | x2y2 | x3y1 | x4y0 |      |      |      |
| y5 | x5 | x0y5 | x1y4 | x2y3 | x3y2 | x4y1 | x5y0 |      |      |
| y6 | x6 | x0y6 | x1y5 | x2y4 | x3y3 | x4y2 | x5y1 | x6y0 |      |
| y7 | x7 | x0y7 | x1y6 | x2y5 | x3y4 | x4y3 | x5y2 | x6y1 | 1x7y0 | 1 |
|    | x  |      | x1y7 | x2y6 | x3y5 | x4y4 | x5y3 | x6y2 | 1x7y1 |
|    |    |      |      | x2y7 | x3y6 | x4y5 | x5y4 | x6y3 | 1x7y2 |
|    |    |      |      |      | x3y7 | x4y6 | x5y5 | x6y4 | 1x7y3 |
|    |    |      |      |      |      | x4y7 | x5y6 | x6y5 | 1x7y4 |
|    |    |      |      |      |      |      | x5y7 | x6y6 | 1x7y5 |
|    |    |      |      |      |      |      |      | x6y7 | 1x7y6 |
|    |    |      |      |      |      |      |      |      | 1x7y7 |
|    |    |      |      |      |      |      |      |      | 1 |

Add →

*Fig. 3B*

| y0 | x0 | x0y0 |      |      |      |      |      |      |   |
|----|----|------|------|------|------|------|------|------|---|
| y1 | x1 | x0y1 | x1y0 |      |      |      |      |      |   |
| y2 | x2 | x0y2 | x1y1 | x2y0 |      |      |      |      |   |
| y3 | x3 | x0y3 | x1y2 | x2y1 | x3y0 |      |      |      |   |
| y4 | x4 | x0y4 | x1y3 | x2y2 | x3y1 | x4y0 |      |      |   |
| y5 | x5 | x0y5 | x1y4 | x2y3 | x3y2 | x4y1 | x5y0 |      |   |
| y6 | x6 | x0y6 | x1y5 | x2y4 | x3y3 | x4y2 | x5y1 | x6y0 |   |
| y7 | x7 | x0y7 | x1y6 | x2y5 | x3y4 | x4y3 | x5y2 | x6y1 | x7y0 | 1 |
|    | x  |      | x1y7 | x2y6 | x3y5 | x4y4 | x5y3 | x6y2 | x7y1 |   |
|    |    |      |      | x2y7 | x3y6 | x4y5 | x5y4 | x6y3 | x7y2 |   |
|    |    |      |      |      | x3y7 | x4y6 | x5y5 | x6y4 | x7y3 |   |
|    |    |      |      |      |      | x4y7 | x5y6 | x6y5 | x7y4 |   |
|    |    |      |      |      |      |      | x5y7 | x6y6 | x7y5 |   |
|    |    |      |      |      |      |      |      | x6y7 | x7y6 |   |
|    |    |      |      |      |      |      |      |      | x7y7 |   |
|    |    |      |      |      |      |      |      |      |      | 1 |

Add →

*Fig. 3C*

| y0 | x0 | x0y0 |      |      |      |      |      |      |
|----|----|------|------|------|------|------|------|------|
| y1 | x1 | x0y1 | x1y0 |      |      |      |      |      |
| y2 | x2 | x0y2 | x1y1 | x2y0 |      |      |      |      |
| y3 | x3 | x0y3 | x1y2 | x2y1 | x3y0 |      |      |      |
| y4 | x4 | x0y4 | x1y3 | x2y2 | x3y1 | x4y0 |      |      |
| y5 | x5 | x0y5 | x1y4 | x2y3 | x3y2 | x4y1 | x5y0 |      |
| y6 | x6 | x0y6 | x1y5 | x2y4 | x3y3 | x4y2 | x5y1 | x6y0 |
| y7 | x7 | x0y7 | x1y6 | x2y5 | x3y4 | x4y3 | x5y2 | x6y1 | x7y0 |
|    | x  |      | x1y7 | x2y6 | x3y5 | x4y4 | x5y3 | x6y2 | x7y1 |
|    |    |      |      | x2y7 | x3y6 | x4y5 | x5y4 | x6y3 | x7y2 |
|    |    |      |      |      | x3y7 | x4y6 | x5y5 | x6y4 | x7y3 |
|    |    |      |      |      |      | x4y7 | x5y6 | x6y5 | x7y4 |
|    |    |      |      |      |      |      | x5y7 | x6y6 | x7y5 |
|    |    |      |      |      |      |      |      | x6y7 | x7y6 |
|    |    |      |      |      |      |      |      |      | x7y7 |

Add →

*Fig. 3D*

MULTIMODAL DIGITAL MULTIPLICATION CIRCUITS AND METHODS

CROSS REFERENCE TO RELATED APPLICATIONS

This application is a continuation of co-pending U.S. application Ser. No. 16/137,195, filed Sep. 20, 2018, which is incorporated by reference in its entirety.

BACKGROUND

The present disclosure relates to digital circuits, and in particular, to digital multimodal multiplication circuits and methods.

Digital circuits process logical signals represented by zeros (0) and ones (1) (i.e., bits). A digital multiplier is an electronic circuit capable of receiving two digital input values and determining a product of the two input values. Performing multiplication digitally can raise a number of challenges. For example, data values being multiplied may be represented digitally in a number of different data types. However, including different multipliers to handle all the different data types a system may need to process would consume circuit area and increase complexity.

One particular application where digital multiplication of different data types is particularly useful is machine learning (aka artificial intelligence). Such applications may require particularly small, efficient, and/or accurate multipliers capable of handling multiple different data types to carry out various system functions.

SUMMARY

Embodiments of the present disclosure pertain to digital circuits with compressed carry. In one embodiment, the present disclosure includes a multimodal digital multiplier circuit comprising binary multiplication circuitry to combine digital bits of a first operand and digital bits of a second operand to produce a plurality of partial product outputs, a plurality of controlled inverter circuits configured to selectively invert a first portion of the partial product outputs of the multiplication circuitry based on a mode control signal, and an adder circuit configured to receive a second portion of the outputs of the multiplication circuitry and outputs of the controlled inverter circuits and produce digital bits corresponding to the product of the first and second operands.

In one embodiment, in a first mode corresponding to the first operand being an unsigned value and the second operand being a signed value, the mode control signal configures the controlled inverter circuits to invert a first plurality of the first portion of partial product outputs of the multiplication circuitry and not invert a second plurality of the first portion of partial product outputs of the multiplication circuitry In one embodiment, in a second mode corresponding to the first operand being a signed value and the second operand being an unsigned value, the mode control signal configures the controlled inverter circuits to invert the second plurality of the first portion of partial product outputs of the multiplication circuitry and not invert the first plurality of the first portion of partial product outputs of the multiplication circuitry In one embodiment, in a third mode corresponding to the first and second operands being signed values, the mode control signal configures the controlled inverter circuits to invert the first and second plurality of the first portion of partial product outputs of the multiplication circuitry In one embodiment, in a fourth mode corresponding to the first and second operands being unsigned values, the mode control signal configures the controlled inverter circuits to not invert the first and second plurality of the first portion of partial product outputs of the multiplication circuitry.

In one embodiment, partial product outputs associated with a most significant bit of the first operand are inverted in a first mode, and partial product outputs associated with a most significant bit of the second operand are inverted in a second mode.

In one embodiment, partial product outputs associated with the most significant bit of the first operand and bits of the second operand excluding the most significant bit of the second operand are inverted in a third mode, and partial product outputs associated with the most significant bit of the second operand and bits of the first operand excluding the most significant bit of the first operand are inverted in the third mode.

In one embodiment, the circuit further comprises two controlled inverter circuits configured to selectively invert two constant bit values based on a mode control signal, wherein the adder circuit is configured to receive the selectively inverted constant bit values.

In one embodiment, the selectively inverted two constant bit values are in the Nth and N+1st partial product bit positions, and wherein in a first mode a value of one is added to the N+1st bit position and a zero value is added to the Nth bit position, in a second mode and a third mode a value of one is added to the Nth bit position and a zero value is added to the N+1st bit position, and in a fourth mode a zero value is added to the Nth bit position and the N+1st bit position.

In one embodiment, a first plurality of controlled inverter circuits are configured to receive partial products resulting from a most significant bit of the first operand combined with the bits of the second operand excluding the most significant bit of the second operand, a second plurality of controlled inverter circuits are configured to receive partial products resulting from a most significant bit of the second operand combined with the bits of the first operand excluding the most significant bit of the first operand, a first controlled inverter circuit is configured to receive a partial product resulting from the most significant bit of the first operand combined with the most significant bit of the second operand, a second controlled inverter circuit is configured to receive first constant bit value, and a third controlled inverter circuits is configured to receive second constant bit value.

In one embodiment, the first and second operands are N bit values and the plurality of controlled inverter circuits comprising 2N+2 controlled inverter circuits.

In one embodiment, the first and second operands are N bit twos complement values.

In one embodiment, the first operand format is one of a signed integer, an unsigned integer, or a float, and wherein the second operand format is one of a signed integer, an unsigned integer, or a float, and wherein the mode control signal is based on the format of both the first operand and second operand.

In another embodiment, the present disclosure includes a method comprising multiplying, in binary multiplication circuitry, digital bits of a first operand and digital bits of a second operand to produce a plurality of partial product outputs, receiving a first portion of the partial product outputs of the multiplication circuitry in a plurality of controlled inverter circuits, selectively inverting the first portion of the partial product outputs of the multiplication circuitry based on a mode control signal, receiving a second portion of the partial product outputs of the multiplication circuitry and outputs of the controlled inverter circuits in an adder circuit, and adding the second portion of the partial product outputs of the multiplication circuitry and the outputs of the controlled inverter circuits to produce digital bits corresponding to the product of the first and second operands.

In another embodiment, the techniques described herein are incorporated in a hardware description language program, the hardware description language program comprising sets of instructions, which when executed produce a digital circuit. The hardware description language program may be stored on a non-transitory machine-readable medium, such as a computer memory (e.g., a data storage system).

The following detailed description and accompanying drawings provide a better understanding of the nature and advantages of the present disclosure.

BRIEF DESCRIPTION OF THE DRAWINGS

FIG. 3A illustrates partial products resulting from multiplication of two signed values.

FIG. 3B illustrates partial products resulting from multiplication of an unsigned value and a signed value.

FIG. 3C illustrates partial products resulting from multiplication of a signed value and an unsigned value.

FIG. 3D illustrates partial products resulting from multiplication of an unsigned value and an unsigned value.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include equivalent modifications of the features and techniques described herein.

Figure 1:
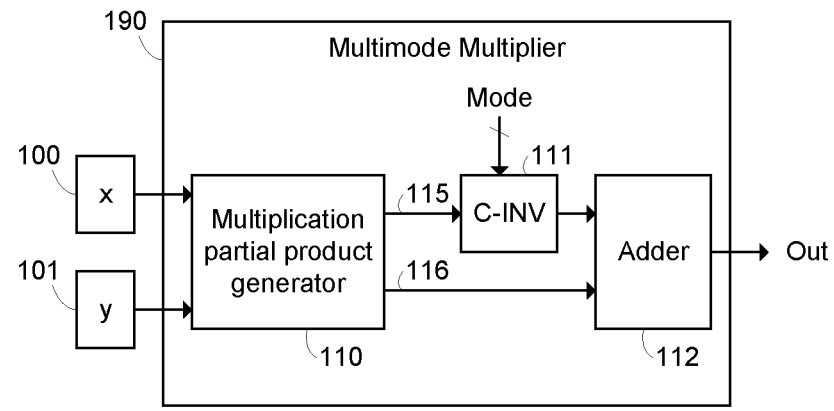
FIG. 1 illustrates a multiplier circuit according to one embodiment.

Features and advantages of the present disclosure include a multimodal multiplier circuit capable of multiplying different data formats. For example, FIG. 1 illustrates a multimodal multiplier circuit 190 according to one embodiment. In some applications, it may be desirable to multiply data in different formats using the same multiplier circuitry. In this example, a multimode multiplier 190 comprises binary multiplication circuitry 110 that receives binary values (values represented by zeros (0) and ones (1)) and generates partial products, an adder 112, and controlled inverters 111. Multiplication circuitry 110 may receive inputs 100 and 101 (e.g., x and y, where x is the multiplier and y is the multiplicand). Multiplication circuitry 100 in multiplier 190 generates a plurality of partial products outputs. Embodiments of the present disclosure include controlled inverters 111 (e.g., inverters that either invert an input or do not invert an input based on a control signal) coupled to particular partial product outputs of multiplication circuitry 110. Advantageously, multiple different data formats may be multiplied using the same multiplier by inverting different partial product outputs based on the format of the inputs bits being multiplied. A mode control signal ("mode") may be used to control the controlled inverters, for example.

Referring again to FIG. 1, storage register circuit 100 stores digital bits corresponding to a first operand (e.g., multiplier, x). Similarly, storage register circuit 101 stores digital bits corresponding to a second operand (e.g., multiplicand, y). Digital bits for x and y are input to multiplication circuitry 110 for multiplying binary bits of the first and second operands (e.g., using logic gates such as AND gates).

Multiplication circuitry 110 produces a plurality of partial product outputs. A first portion 115 of the partial product outputs are coupled to controlled inverter circuits 111. Controlled inverter circuits 111 also receive mode control signals, which configure the controlled inverter circuits to selectively invert digital values received on their inputs. For example, when a mode control signal coupled to a particular controlled inverter is in a first logic state, the controlled inverter may invert a digital value, and when the mode control signal is in a second logic state, the controlled inverter may not invert the digital signal (i.e., the signal passes through unchanged). Accordingly, controlled inverter circuits 111 may be configured to selectively invert a first portion of partial product outputs of the multiplication circuitry 110 based on the mode control signal. Finally, an adder circuit 112 may be configured to receive a second portion 116 of the outputs of the multiplication circuitry 110 and outputs of the controlled inverter circuits 111. Adder circuit 112 may sum the partial products to produce a total product output value ("Out"), for example.

One feature of the present disclosure is the ability to multiply digital values represented as either or both of signed or unsigned integer values. For example, one input, x, may be either signed or unsigned, and another input, y, may be either signed or unsigned. Multiplying combinations of signed and unsigned values may require different circuitry for performing different multiplication algorithms. Advantageously, embodiments of the present disclosure include a mode control signal corresponding to the combination of signed and unsigned values to be multiplied. For example, a mode control signal may encode four (4) different cases (or modes) for multiplying x and y: (y-signed, x-signed), (y-unsigned, x-signed), (y-signed, x-unsigned), and (y-unsigned, x-unsigned). Accordingly, in a first mode corresponding to the operand y being an unsigned value and operand x being a signed value, the mode control signal configures the controlled inverter circuits 111 to invert a first plurality of the first portion 115 of partial product outputs of the multiplication circuitry 110 and not invert a second plurality of the first portion 115 of partial product outputs of the multiplication circuitry 110. In a second mode corresponding to operand y being a signed value and operand x being an unsigned value, the mode control signal configures the controlled inverter circuits 111 to invert the second plurality of the first portion 115 of partial product outputs of the multiplication circuitry 110 and not invert the first plurality of the first portion 115 of partial product outputs of the multiplication circuitry. Additionally, in a third mode corresponding to the operands x and y both being signed values, the mode control signal configures the controlled inverter circuits 111 to invert the first and second plurality of the first portion 115 of partial product outputs of the multiplication circuitry 110. Finally, in a fourth mode corresponding to the operands x and y both being unsigned, the mode control signal configures the controlled inverter circuits 111 to not invert any of the first portion 115 of partial product outputs of the multiplication circuitry 110.

Figure 2:
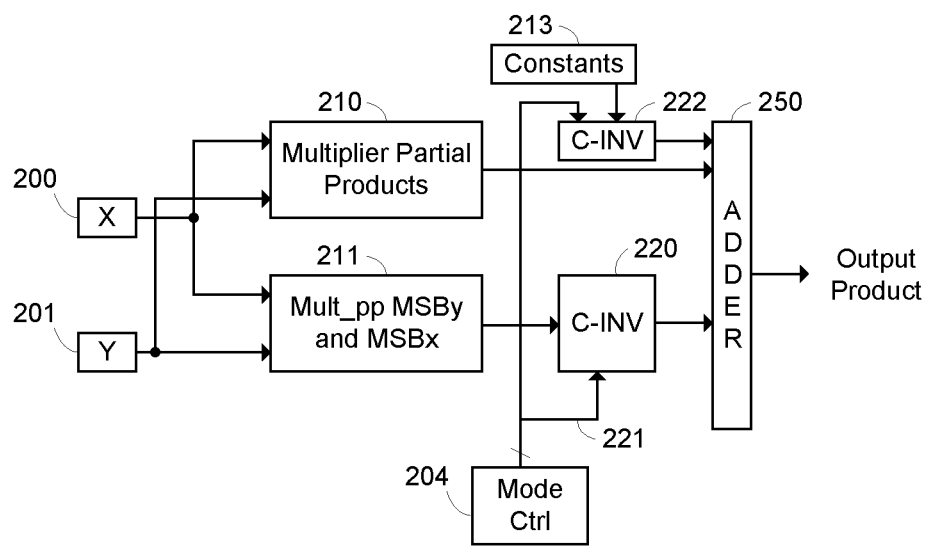
FIG. 2 illustrates an example multiplier circuit according to another embodiment.

FIG. 2 illustrates an example multiplier circuit according to another embodiment. In this example, bits for values x and y are stored in register circuits 200 and 201. Operands x and y may be N bit twos complement values, for example. This example illustrates that the multiplication of bits in a multiplier may be divided up into different groups of partial products. For example, a multiplier circuit may comprise multiplication circuitry 210 for generating one set of partial products, and multiplication circuitry 211 may correspond to circuits for generating partial product outputs associated with a most significant bit of operand y and partial product outputs associated with a most significant bit of operand x, respectively. For instance, circuits 211 may be used to generate partial products xNyN−1, . . . xNy0, xN−1yN, . . . x0yN, and xNyN. The partial products for the most significant bits of x and y are coupled through a controlled inverter circuits 220, which are configured to either invert or not invert each partial product based on mode control signal 221 from mode control generator circuit 204, for example. Mode control generator circuit 204 may set the values of multiple signal lines of mode control signal 221 based on the format of x and y (e.g., signed-signed, signed-unsigned, unsigned-signed, or unsigned-unsigned). Accordingly, in a one mode, partial product outputs associated with a most significant bit of operand x may be inverted, and in another mode, partial product outputs associated with a most significant bit of operand y may be inverted, for example.

Furthermore, this example illustrates that constants may be selectively coupled to adder 250 and added to the partial products. For example, a plurality of constants 213 (e.g., bits=1) in a plurality of different bit positions may be coupled through controlled inverter circuits 222 to adder 250 and added together with the partial products. In one embodiment described in more detail below, two controlled inverter circuits are configured to selectively invert two constant bit values based on a mode control signal, and the adder circuit is configured to receive the selectively inverted constant bit values.

Finally, in the example in FIG. 2, the selectively inverted (e.g., based on the mode control signal) partial products from controlled inverter circuits 220, the partial products from multiplication circuitry 210, and the selectively inverted constants 213 are coupled to adder 250 and summed to produce an output product. In some embodiments, the output product may be in the form of a sum and a carry, for example.

Figure 3A:
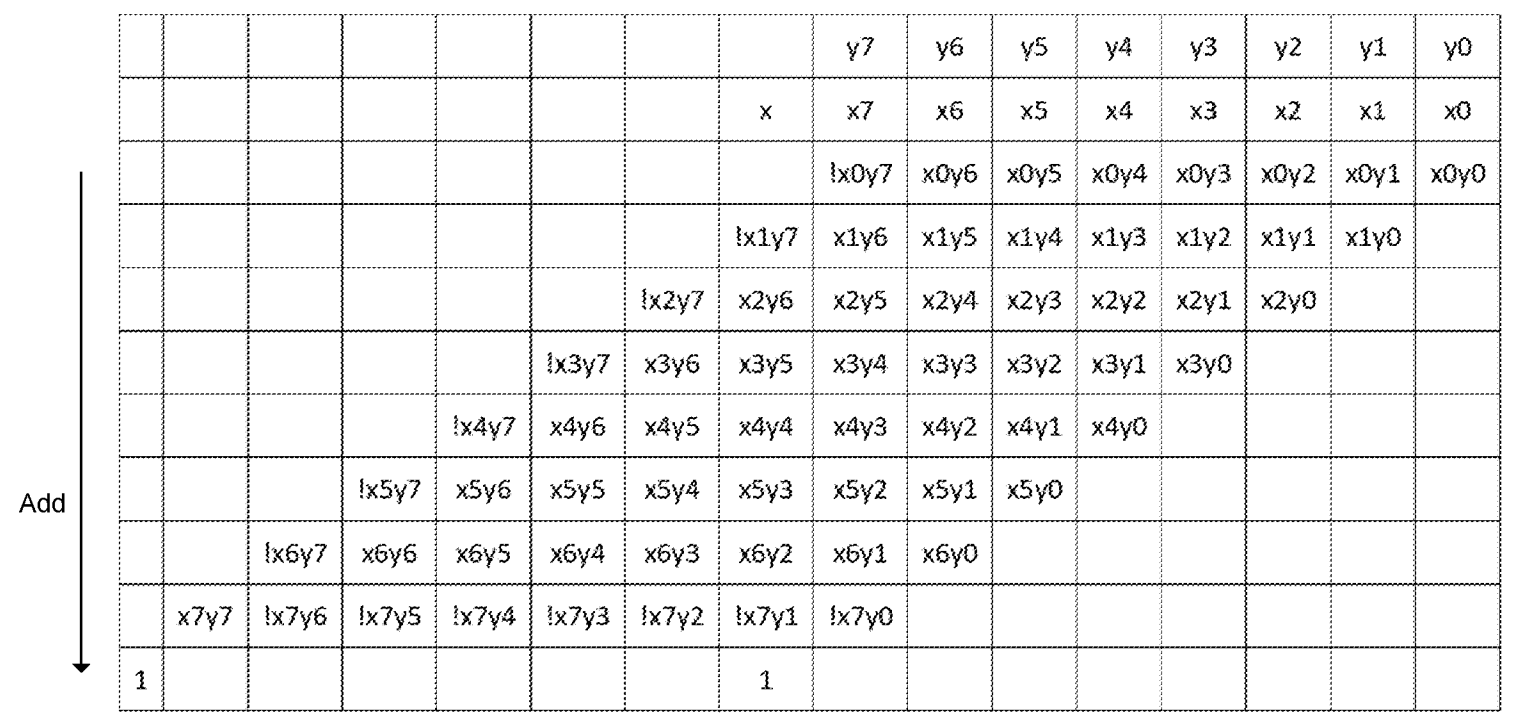

FIGS. 3A-3D illustrate multiplication of two operands using different modes according to embodiments of the disclosure. In these examples, y is the multiplicand and x is the multiplier. FIG. 3A illustrates multiplication where y is signed and x is signed. Here, partial product outputs associated with the most significant bit of operand y (e.g., y7) and bits of operand x (x0-x6), excluding the most significant bit of operand x (e.g., x7y7) are inverted (e.g., see the MSB edge of the diagonal). Additionally, partial product outputs associated with the most significant bit of operand x (e.g., x7) and bits of operand y (e.g., y0-y6), excluding the most significant bit of operand y (e.g., x7y7) are inverted (e.g., see the last row of partial products). Additionally, in this multiplication, constant values are added in the 2N+1 bit position, designating a negative number in 2's complement, and in the N+1$^{st}$ position. However, the other partial products are not inverted in this multiplication. Accordingly, controlled inverters may be configured to invert the partial products associated with the most significant bits of x and y, but not the partial product associated with xNyN. Additionally, a controlled inverter may be used to selectively couple a 1 to the N+1$^{st}$ bit position (e.g., a controlled inverter with an input value of 0). Additionally, controlled inverter circuits may be used to selectively couple a 1 to the 2N bit position as illustrated in FIG. 3A, for example, when the circuit is in a signed-signed input mode. Here, the 2N bit is bit 15 (the 16$^{th}$ bit, where the first bit is the 0$^{th}$ position) and represents a negative number, −(2^15), for example. Partial products illustrated in FIG. 3A may be added to produce a resulting output product.

FIG. 3B illustrates multiplication where y is unsigned and x is signed. A twos complement multiplication may be factored to produce the following:

$$xy = \sum_{i=0}^{n-2}\left(\sum_{j=0}^{n-1} x_i y_j 2^{(i+j)}\right) - 2^{n-1} x_{n-1} \sum_{j=0}^{n-1} 2^j y_j; \text{ or}$$

$$\sum_{i=0}^{n-2}\sum_{j=0}^{n-1} x_i y_j 2^{i+j} - 2^{n-1} x_{n-1} \sum_{j=0}^{n-1} 2^j y_j.$$

The x and y partial products for the above is shown in FIG. 3B. In this example, partial product outputs associated with a most significant bit of operand x (e.g., x7) are inverted and other partial products are not inverted. Similar to above, a 1 is added in the 2Nth bit (e.g., 2N position representing a negative number). Here, a second 1 bit is added in the Nth bit position. These inverted partial products associated with the x MSB (here, x7) and the 1 bits at N and 2N may be selectively coupled to an adder using controlled inverter circuits based on a mode control signal, for example. Partial products illustrated in FIG. 3B may be added to produce a resulting output product.

FIG. 3C illustrates multiplication where y is signed and x is unsigned. A twos complement multiplication may be factored to produce the following:

$$xy = \sum_{i=0}^{n-1}\left(\sum_{j=0}^{n-2} x_i y_j 2^{(i+j)}\right) - 2^{n-1} y_{n-1} \sum_{i=0}^{n-1} 2^i x_i; \text{ or}$$

$$\sum_{i=0}^{n-1}\sum_{j=0}^{n-2} x_i y_j 2^{i+j} - 2^{n-1} y_{n-1} \sum_{i=0}^{n-1} 2^i x_i.$$

The x and y partial products for the above is shown in FIG. 3C. In this example, partial product outputs associated with a most significant bit of operand y (e.g., y7) are inverted and other partial products are not inverted. Similar to above, a 1 is added in the 2Nth bit position (e.g., 2N position representing a negative number). Here, a second 1 bit is added in the Nth bit position. These inverted partial products associated with the y MSB (here, y7) and the 1 bits added at N and 2N may be selectively coupled to an adder using controlled inverter circuits based on a mode control signal, for example.

FIG. 3D illustrates partial products resulting from multiplication of an unsigned value and an unsigned value. This case represents the case where none of the partial products are inverted and no constant values are added. Accordingly, the constant 1 values and inversions described above are all turned off, and the partial products may be output directly without inversion.

FIG. 3A-D illustrate that a multimodal multiplier may be implemented for x and y operands comprising N bit values using 2N+2 controlled inverter circuits, for example. When multiplying signed-signed operands, 2(N−1) partial products of the MSBs of x and y are inverted (excluding the product of both MSBs xNyN), and two constant values of 1 may be selectively introduced in bit positions N+1 and 2N as illustrated in FIG. 3A. When multiplying y-unsigned and x-signed operands, N partial products of the MSB of x are inverted and two constant values of 1 may be selectively introduced in bit positions N and 2N as illustrated in FIG. 3B. Alternatively, when multiplying y-signed and x-unsigned operands, N partial products of the MSB of y are inverted and two constant values of 1 may be selectively introduced in bit positions N and 2N as illustrated in FIG. 3C. Finally, when multiplying y-unsigned and x-unsigned operands, the partial products are not inverted and no constants are added as illustrated in FIG. 3D. Advantageously, the above described multiplier supports combinations of input formats. For example, the first operand format may be one of a signed integer, an unsigned integer, or a float, and the second operand format may be one of a signed integer, an unsigned integer, or a float. The mode control signal is based on the format of both the first operand and second operand so that the appropriate mode control signal may be sent to the multiplier to configure the controlled inverter circuits as described above.

Figure 4A:
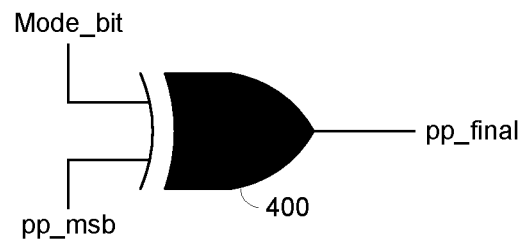
FIG. 4A illustrates an example controlled inverter circuit according to an embodiment.

FIG. 4A illustrates an example controlled inverter circuit according to an embodiment. In this example, a controlled inverter is implemented as an XOR logic circuit, where one input is coupled to the partial product to be inverted (e.g., a partial product associated with an MSB as described above, pp_msb) and the other input is coupled to one bit of the mode control signal, for example. When the mode bit is in one state, the XOR passes the pp_msb unchanged, and when the mode bit is in another state, the XOR inverts the pp_msb.

Figure 4B:
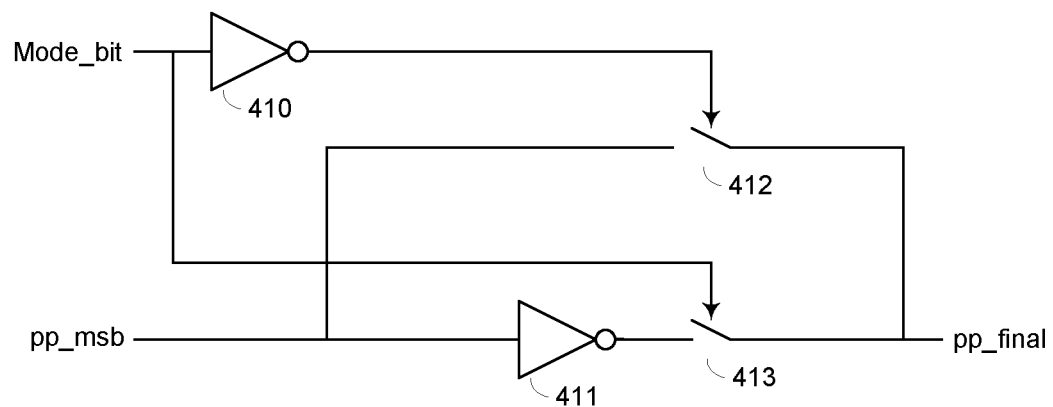
FIG. 4B illustrates another example controlled inverter circuit according to an embodiment.

FIG. 4B illustrates another example controlled inverter circuit according to an embodiment. In this example, a mode bit is coupled through an inverter to create an inverse mode bit. A partial product to be inverted is coupled to the output through one of two paths. A first path through switch 412 couples the partial product to the output unchanged. A second path through inverter 411 and switch 413 couples the partial product to the output inverted. Mode bit and inverse mode bit are configured so that only one of switches 412 and 413 are closed at any given time. Circuits using the techniques shown in FIGS. 4A and 4B are example means for selectively inverting the partial product outputs from the multiplication circuitry based on a mode control signal.

Figure 5:
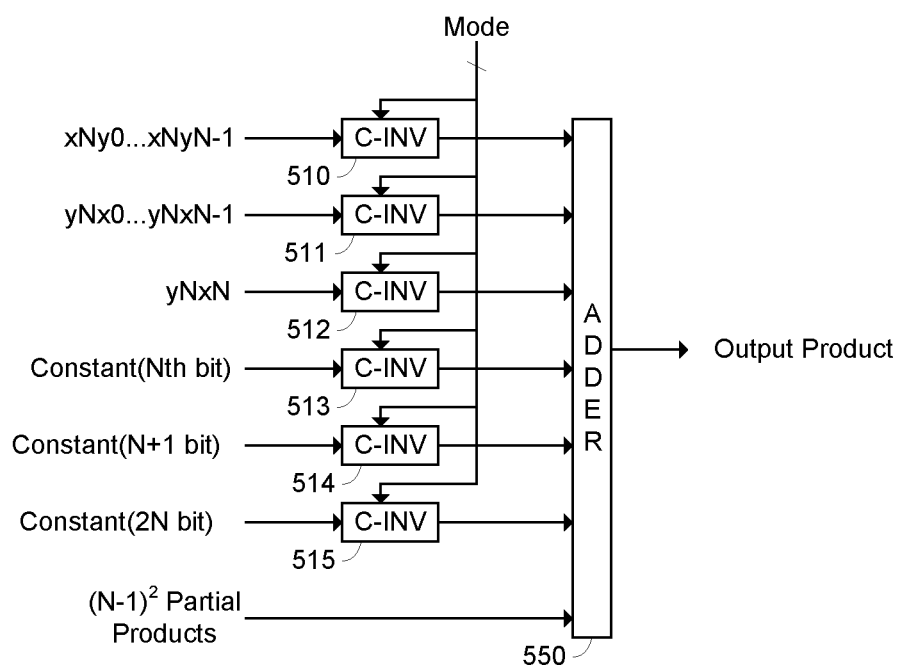
FIG. 5 illustrates example multiplier circuits according to another embodiment.

FIG. 5 illustrates example multiplier circuits according to another embodiment. In this example, a multiplier includes controlled inverter circuits 510-515 configured using a mode control signal ("mode"), which may configure the system into one of four (4) states based on whether the input operands are both signed, signed-unsigned, unsigned-signed, or both unsigned. The input operands may be integer values or significands of floating point values represented in twos complement binary, for example. Floating point values may have the form "significand×base$^{exponent}$," where the exponents may be added (not shown). A first plurality of controlled inverter circuits 510 are configured to receive partial products resulting from a most significant bit of operand x (xN) combined with the bits of operand y excluding the most significant bit (y0 . . . yN−1). Similarly, a second plurality of controlled inverter circuits 511 are configured to receive partial products resulting from a most significant bit of operand y (yN) combined with the bits of operand x excluding the most significant bit (x0 . . . xN−1). Another controlled inverter circuit 512 is configured to receive a partial product resulting from the most significant bit of operand x combined with the most significant bit of operand y (xNyN). Further, a controlled inverter circuit 513 is configured to receive a constant bit value and selectively include a 1 in the Nth bit position to be added with partial products in the Nth bit position (e.g., for unsigned-signed mode and signed-unsigned mode). Similarly, a controlled inverter circuit 514 is configured to receive a constant bit value and selectively include a 1 in the N+1 bit position to be added with partial products in the N+1 bit position (for signed-signed mode). Additionally, a controlled inverter circuit 515 is configured to receive a constant bit value and selectively include a 1 in the 2N bit position (for all modes but unsigned-unsigned mode). Finally, (N−1)$^2$ partial products may be coupled directly to the input of adder 550 to be combined with the outputs of controlled inverters 510-515 to produce a final output product, for example.

Figure 6:
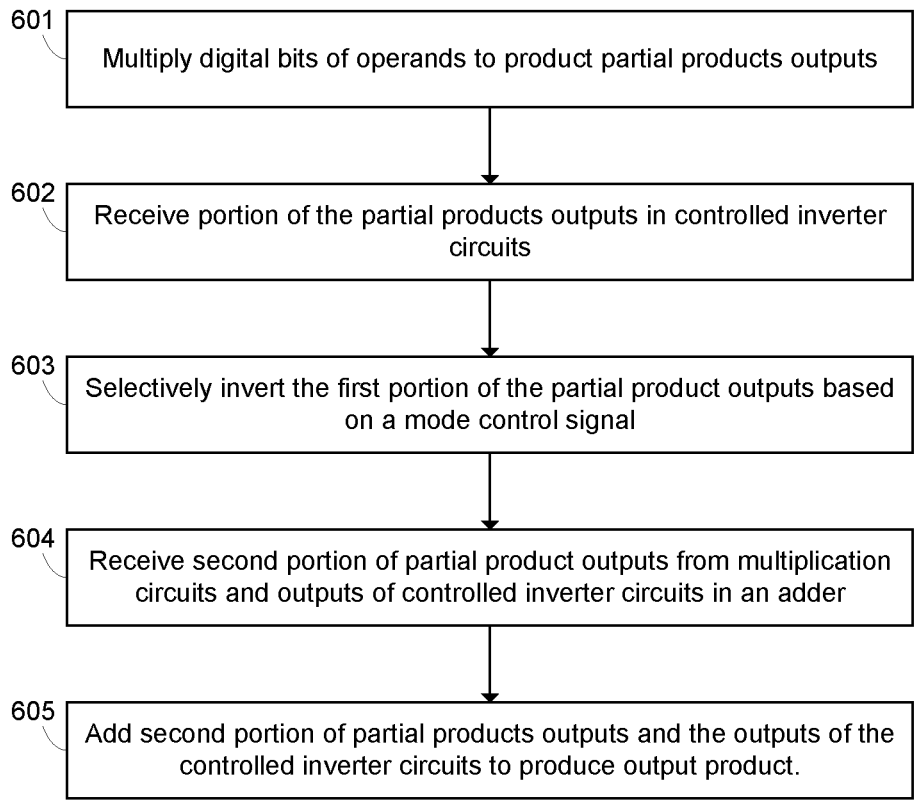
FIG. 6 illustrates a method of multiplying according to another embodiment.

FIG. 6 illustrates a method of multiplying according to another embodiment. At 601, digital bits of first and second operands may be multiplied to produce partial products. The digital bits may be twos complement integers or floating point numbers, for example. The operands format may be combinations of a signed integer and an unsigned integer, or two floats, for example. Multiplication circuitry may comprise logic for combining each digital value to produce a partial product (e.g., logic circuits such as AND gates). At 602, a first portion of the partial product outputs of the multiplication circuitry are received in a plurality of controlled inverter circuits. At 603, the first portion of the partial product outputs of the multiplication circuitry are selectively inverted based on a mode control signal. For example, in different modes, some partial products of the first portion are inverted, while in other modes other partial products of the first portion are inverted as illustrated above in FIGS. 3A-D, for example. At 604, a second portion of the partial product outputs of the multiplication circuitry and outputs of the controlled inverter circuits are received in an adder circuit. An adder circuit may also receive controlled inverter circuits having inputs coupled to constant values to selectively add a 1 in particular bit positions in different modes, for example. At 605, the second portion of the partial product outputs of the multiplication circuitry and the outputs of the controlled inverter circuits are added to produce digital bits corresponding to the product of the first and second operands. In one embodiment, the result may comprise a sum and a carry, for example.

Figure 7:
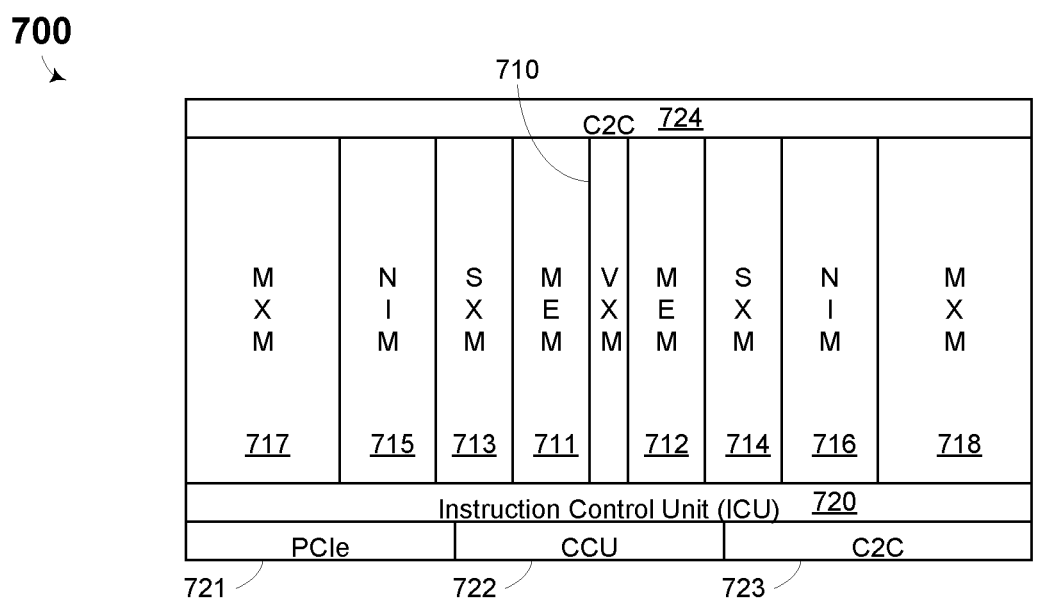
FIG. 7 illustrates an example machine learning processor according to one embodiment.

FIG. 7 illustrates an example machine learning processor according to one embodiment. Machine learning processor 700 (aka, Artificial Intelligence (AI) processor) may include memory and arithmetic units optimized for multiplying and adding input data with weight sets (e.g., trained or being trained) for machine learning applications (e.g., training or inference). For example, machine learning processor 700 includes a vector processor (VxM) 710 for performing operations on vectors (i.e., one-dimensional arrays of values). In this example, other elements of the system are arranged symmetrically on either side of the VxM 710 to optimize processing speed. For example, VxM 710 is adjacent to memories 711 and 712, switch matrices (SxM) 713 and 714 to control routing of data, data format and presentation controllers (NIM) 715 and 716, and a matrix multiplication unit (MxM) 717 and 718. MxMs 717 and 718 and VxM 710 may include circuits as described herein for example. An instruction control unit (ICU) 720 controls the flow of data and execution of operations across blocks 710-718, for example. Machine learning processor 700 includes communications circuits such as chip-to-chip (C2C) circuits 723-724 (e.g., for parallel operation of multiple processors 700) and an external communication circuit (e.g., PCIe) 721 (e.g., for communication with other computer systems, such as one or more servers). Processor 700 may further include a chip control unit (CCU) 722 to control boot operations, clock resets, and other low level setup operations, for example.

The above specification provides illustrative and example descriptions of various embodiments. While the present disclosure illustrates various techniques and embodiments as physical circuitry (e.g., on an integrated circuit), it is to be understood that such techniques and innovations may also be embodied in a hardware description language program such as VHDL or Verilog as is understood by those skilled in the art. A hardware description language (HDL) is a specialized computer language used to describe the structure and behavior of electronic circuits, including digital logic circuits. A hardware description language results in an accurate and formal description of an electronic circuit that allows for the automated analysis and simulation of an electronic circuit. An HDL description may be synthesized into a netlist (e.g., a specification of physical electronic components and how they are connected together), which can then be placed and routed to produce the set of masks used to create an integrated circuit including the elements and functions described herein.

The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A multimodal multiplier circuit comprising:
   a multiplier circuit configured to generate a plurality of partial products of a first operand and a second operand;
   a plurality of inverter circuits configured to:
      generate a first version of a first plurality of a first portion of the partial products and a second version of a second plurality of the first portion of the partial products based on a plurality of different bits of a mode control signal, and
      invert a first subset of a plurality of constant bit values and not invert a second subset of the constant bit values based on the plurality of different bits of the mode control signal to generate a version of the constant bit values; and
   an adder circuit configured to add the first version of the first plurality, the second version of the second plurality and a second portion of the partial products to generate bits of a product of the first and second operands.

2. The multimodal multiplier circuit of claim 1, wherein:
   in a first mode of the multimodal multiplier circuit corresponding to the first operand being an unsigned value and the second operand being a signed value, the mode control signal configures the inverter circuits to invert the first plurality of the first portion of the partial products and not invert the second plurality of the first portion of the partial products,
   in a second mode of the multimodal multiplier circuit corresponding to the first operand being a signed value and the second operand being an unsigned value, the mode control signal configures the inverter circuits to not invert the first plurality of the first portion of the partial products and invert the second plurality of the first portion of the partial products,
   in a third mode of the multimodal multiplier circuit corresponding to the first and second operands being signed values, the mode control signal configures the inverter circuits to invert the first and second pluralities of the first portion of the partial products, and
   in a fourth mode of the multimodal multiplier circuit corresponding to the first and second operands being unsigned values, the mode control signal configures the inverter circuits to not invert the first and second pluralities of the first portion of the partial products.

3. The multimodal multiplier circuit of claim 1, wherein the adder circuit is further configured to add the first version of the first plurality, the second version of the second plurality, the second portion of the partial products, and the version of the constant bit values to generate the product.

4. The multimodal multiplier circuit of claim 1, wherein:
   a first plurality of the inverter circuits are configured to receive a first subset of the partial products resulting from a most significant bit of the first operand combined with bits of the second operand excluding a most significant bit of the second operand,
   a second plurality of the inverter circuits are configured to receive a second subset of the partial products resulting from the most significant bit of the second operand combined with bits of the first operand excluding the most significant bit of the first operand,
   a first of the inverter circuits is configured to receive a partial product of the plurality of partial products resulting from the most significant bit of the first operand combined with the most significant bit of the second operand,
   a second of the inverter circuits is configured to receive a first constant bit value,
   a third of the inverter circuits is configured to receive a second constant bit value, and
   outputs of the first plurality of the inverter circuits, the second plurality of the inverter circuits, the first inverter circuit, the second inverter circuit and the third inverter circuit are input into the adder circuit.

5. The multimodal multiplier circuit of claim 1, wherein the first and second operands are N bit values and the plurality of inverter circuits comprising 2N+2 inverter circuits.

6. The multimodal multiplier circuit of claim 1, wherein:
   in a first mode of the multimodal multiplier circuit corresponding to the first operand being an unsigned value and the second operand being a signed value, two or more of the partial products associated with a most significant bit of the first operand are inverted based on the mode control signal, and
   in a second mode of the multimodal multiplier circuit corresponding to the first operand being a signed value and the second operand being an unsigned value, two or more of the partial products associated with a most significant bit of the second operand are inverted based on the mode control signal.

7. The multimodal multiplier circuit of claim 6, wherein:
in a third mode of the multimodal multiplier circuit corresponding to the first and second operands being signed values, the two or more of the partial products associated with the most significant bit of the first operand and bits of the second operand excluding the most significant bit of the second operand are inverted based on the mode control signal, and
the two or more of the partial products associated with the most significant bit of the second operand and bits of the first operand excluding the most significant bit of the first operand are inverted in the third mode based on the mode control signal.

8. The multimodal multiplier circuit of claim 1, wherein:
the first and second operands are N bit values,
the plurality of constant bit values are in bit positions corresponding to Nth and $N+1^{st}$ bit positions of a partial product of the plurality of partial products,
in a first mode of the multimodal multiplier circuit corresponding to the first operand being an unsigned value and the second operand being a signed value, a value of one is added to the $N+1^{st}$ bit position,
in a second mode of the multimodal multiplier circuit corresponding to the first operand being a signed value and the second operand being an unsigned value, a value of one is added to the Nth bit position, and
in a third mode of the multimodal multiplier circuit corresponding to the first and second operands being signed values, a value of one is added to the Nth bit position.

9. The multimodal multiplier circuit of claim 1, wherein the first and second operands are N bit twos complement values.

10. The multimodal multiplier circuit of claim 1, wherein:
a first format of the first operand is one of a signed integer, an unsigned integer, or a float,
a second format of the second operand is one of a signed integer, an unsigned integer, or a float, and
the different bits of the mode control signal are based on the first and second formats-4 both the first and second operands.

11. A method performed by a multimodal multiplier circuit, the method comprising:
generating, by a multiplier circuit of the multimodal multiplier circuit, a plurality of partial products of a first operand and a second operand;
generating, by a plurality of inverter circuits of the multimodal multiplier circuit, a first version of a first plurality of a first portion of the partial products and a second version of a second plurality of the first portion of the partial products based on a plurality of different bits of a mode control signal;
inverting, by the plurality of inverter circuits, a first subset of a plurality of constant bit values without inverting a second subset of the constant bit values based on the plurality of different bits of the mode control signal to generate a version of the constant bit values; and
adding, by an adder circuit of the multimodal multiplier circuit, the first version of the first plurality, the second version of the second plurality and a second portion of the partial products to generate bits of a product of the first and second operands.

12. The method of claim 11, further comprising:
inverting, by the plurality of inverter circuits in a first mode corresponding to the first operand being an unsigned value and the second operand being a signed value, the first plurality of the first portion of the partial products based on the mode control signal to generate the first version of the first plurality;
inverting, by the plurality of inverter circuits in a second mode corresponding to the first operand being a signed value and the second operand being an unsigned value, the second plurality of the first portion of the partial products based on the mode control signal to generate the second version of the second plurality; and
inverting, by the plurality of inverter circuits in a third mode corresponding to the first and second operands being signed values, the first and second pluralities of the first portion of the partial products based on the mode control signal to generate the first version of the first plurality and the second version of the second plurality, wherein
in a fourth mode corresponding to the first and second operands being unsigned values, the first and second pluralities of the first portion of the partial products are not inverted.

13. The method of claim 11, further comprising:
adding, by the adder circuit, the first version of the first plurality, the second version of the second plurality, the second portion of the partial products, and the version of the constant bit values to generate the product.

14. The method of claim 11, further comprising:
receiving, at a first plurality of the inverter circuits, a first subset of the partial products resulting from a most significant bit of the first operand combined with bits of the second operand excluding a most significant bit of the second operand;
receiving, at a second plurality of the inverter circuits, a second subset of the partial products resulting from the most significant bit of the second operand combined with bits of the first operand excluding the most significant bit of the first operand;
receiving, at a first of the inverter circuits, a partial product of the plurality of partial products resulting from the most significant bit of the first operand combined with the most significant bit of the second operand;
receiving, at a second of the inverter circuits, a first constant bit value;
receiving, at a third of the inverter circuits, a second constant bit value; and
adding, by the adder circuit, outputs of the first plurality of the inverter circuits, the second plurality of the inverter circuits, the first inverter circuit, the second inverter circuit and the third inverter circuit.

15. The method of claim 14, wherein the first and second operands are N bit values and the inverter circuits comprising 2N+2 inverter circuits.

16. The method of claim 11, further comprising:
inverting, by the plurality of inverter circuits in a first mode corresponding to the first operand being an unsigned value and the second operand being a signed value, two or more of the partial products associated with a most significant bit of the first operand based on the mode control signal;
inverting, by the plurality of inverter circuits in a second mode corresponding to the first operand being a signed value and the second operand being an unsigned value, two or more of the partial products associated with a most significant bit of the second operand based on the mode control signal;

inverting, by the plurality of inverter circuits in a third mode corresponding to the first and second operands being signed values, the two or more of the partial products associated with the most significant bit of the first operand and bits of the second operand excluding the most significant bit of the second operand based on the mode control signal; and inverting, by the plurality of inverter circuits in the third mode, the two or more of the partial products associated with the most significant bit of the second operand and bits of the first operand excluding the most significant bit of the first operand based on the mode control signal.

17. The method of claim 11, wherein the first and second operands are N bit values, the plurality of constant bit values are in bit positions corresponding to Nth and $N+1^{st}$ bit positions of a partial product of the plurality of partial products, and the method further comprising:

adding, by the adder circuit in a first mode corresponding to the first operand being an unsigned value and the second operand being a signed value, a value of one to the $N+1^{st}$ bit position;

adding, by the adder circuit in a second mode corresponding to the first operand being a signed value and the second operand being an unsigned value, a value of one to the Nth bit position; and adding, by the adder circuit in a third mode corresponding to the first and second operands being signed values, a value of one to the Nth bit position.

18. A non-transitory machine-readable medium storing a hardware description language program, the hardware description language program comprising sets of instructions, which when executed producing a digital circuit comprising:

a multiplier circuit configured to generate a plurality of partial products of a first operand and a second operand;

a plurality of inverter circuits configured to:
generate a first version of a first plurality of a first portion of the partial products and a second version of a second plurality of the first portion of the partial products based on a plurality of different bits of a mode control signal, and
invert a first subset of a plurality of constant bit values and not invert a second subset of the constant bit values based on the plurality of different bits of the mode control signal to generate a version of the constant bit values; and an adder circuit configured to add the first version of the first plurality, the second version of the second plurality and a second portion of the partial products to generate bits of a product of the first and second operands.

* * * * *

UNITED STATES PATENT AND TRADEMARK OFFICE
CERTIFICATE OF CORRECTION

| | | |
|---|---|---|
| PATENT NO. | : 11,301,212 B1 | Page 1 of 1 |
| APPLICATION NO. | : 17/060621 | |
| DATED | : April 12, 2022 | |
| INVENTOR(S) | : Christopher Aaron Clark | |

It is certified that error appears in the above-identified patent and that said Letters Patent is hereby corrected as shown below:

In the Claims

Column 11, Claim 10, Lines 45-46, delete "formats-4 both the first and second operands." and insert -- formats. --, therefor.

Signed and Sealed this
Sixteenth Day of August, 2022

*Katherine Kelly Vidal*

Katherine Kelly Vidal
*Director of the United States Patent and Trademark Office*